US008710119B2

(12) United States Patent
Yamaguchi

(10) Patent No.: US 8,710,119 B2
(45) Date of Patent: Apr. 29, 2014

(54) PROCESS FOR PRODUCING POLYPHENYLENE ETHER COMPOSITION

(75) Inventor: Toru Yamaguchi, Tokyo (JP)

(73) Assignee: Asahi Kasei Chemicals Corporation, Tokyo (JP)

(*) Notice: Subject to any disclaimer, the term of this patent is extended or adjusted under 35 U.S.C. 154(b) by 1111 days.

(21) Appl. No.: 11/470,831

(22) Filed: Sep. 7, 2006

(65) Prior Publication Data

US 2007/0259993 A1    Nov. 8, 2007

(51) Int. Cl.
*C08K 9/00* (2006.01)
*C08K 9/02* (2006.01)
*C08G 59/42* (2006.01)
*C08K 9/06* (2006.01)
*C08K 3/34* (2006.01)

(52) U.S. Cl.
USPC ........... 523/200; 523/204; 523/212; 523/324; 524/445

(58) Field of Classification Search
USPC ................................ 523/200–217
See application file for complete search history.

(56) References Cited

U.S. PATENT DOCUMENTS

| | | | |
|---|---|---|---|
| 4,501,857 A | 2/1985 | Kishimoto et al. | |
| 4,727,093 A | 2/1988 | Allen et al. | |
| 5,026,787 A | 6/1991 | Takagi et al. | |
| 5,589,541 A * | 12/1996 | Kinoshita et al. | 525/66 |
| 6,133,379 A * | 10/2000 | Yamagishi | 525/241 |
| 6,146,575 A * | 11/2000 | Huston | 264/349 |
| 6,521,690 B1 * | 2/2003 | Ross et al. | 524/445 |
| 6,833,096 B2 | 12/2004 | Wang et al. | |
| 7,439,284 B2 | 10/2008 | Alger et al. | |
| 2002/0025420 A1 * | 2/2002 | Wanat et al. | 428/213 |
| 2006/0241212 A1 * | 10/2006 | Ozeki | 523/212 |
| 2007/0060677 A1 | 3/2007 | Yoshida et al. | |

FOREIGN PATENT DOCUMENTS

| | | |
|---|---|---|
| JP | 63-030122 | 12/1988 |
| JP | 1-297428 | 11/1989 |
| JP | 5-163401 | 6/1993 |
| JP | 10-180842 | 7/1998 |
| JP | 2001-294745 | 10/2001 |
| JP | 2004-136641 | 5/2004 |
| JP | 2004-137447 | 5/2004 |
| JP | 2004-137450 | 5/2004 |
| JP | 2004-263079 | 9/2004 |
| JP | 2005-501759 | 1/2005 |
| JP | 2006-306061 | 11/2006 |
| WO | 03/020483 | 3/2003 |
| WO | WO 2004016692 A1 * | 2/2004 |
| WO | 2005/030872 | 4/2005 |

OTHER PUBLICATIONS

Machine translation of JP 2004-0137447 A (Asahi Kasei Chemicals Corp, Published May 13, 2004).*
Rockwell Automation. "Extrusion Processes" [brochure]. "Publication D-7741," Mar. 2000.*
Mineral Fillers: Treated Clays, Water-washed and Calcin (Jan. 2009) Available online at: http://www.akrochem.com/pdfs/minerals/X-nucapnulok.pdf.*
English Language Abstract of JP 2006-306061.
English Language Abstract of JP 2004-137447.
English Language Abstract of JP 2004-263079.
English Language Abstract of JP 2004-137450.
English Language Abstract of JP 1-297428.
English Language Abstract of JP 63-030122.
English Language Abstract of JP 2005-501759.
English Language Abstract of JP 10-180842.
English Language Abstract of JP 2004-136641.

* cited by examiner

*Primary Examiner* — Ling Choi
*Assistant Examiner* — Ronald Grinsted
(74) *Attorney, Agent, or Firm* — Greenblum & Bernstein, P.L.C.

(57) ABSTRACT

Mass productivity and production stability of a polyphenylene ether composition are improved without deteriorating physical properties by means of a production process of polyphenylene ether composition comprising pre-melt compounding 20 to 98.5% by mass of a polyphenylene ether powder (I), 1 to 60% by mass of an inorganic filler powder (II) and 0.5 to 20% by mass of a thermoplastic elastomer having functional group (III), followed by melt compounding; wherein melt compounding is conducted using a twin-screw extruder having a total length of barrels of 800 mm or more, and a pre-melt compounding zone occupies 45 to 80 % of upstream of the twin-screw extruder based on the total length 100% of the twin-screw extruder when a drive side and a molten compound discharging side of the twin-screw extruder are regarded as upstream and downstream, respectively.

9 Claims, 1 Drawing Sheet

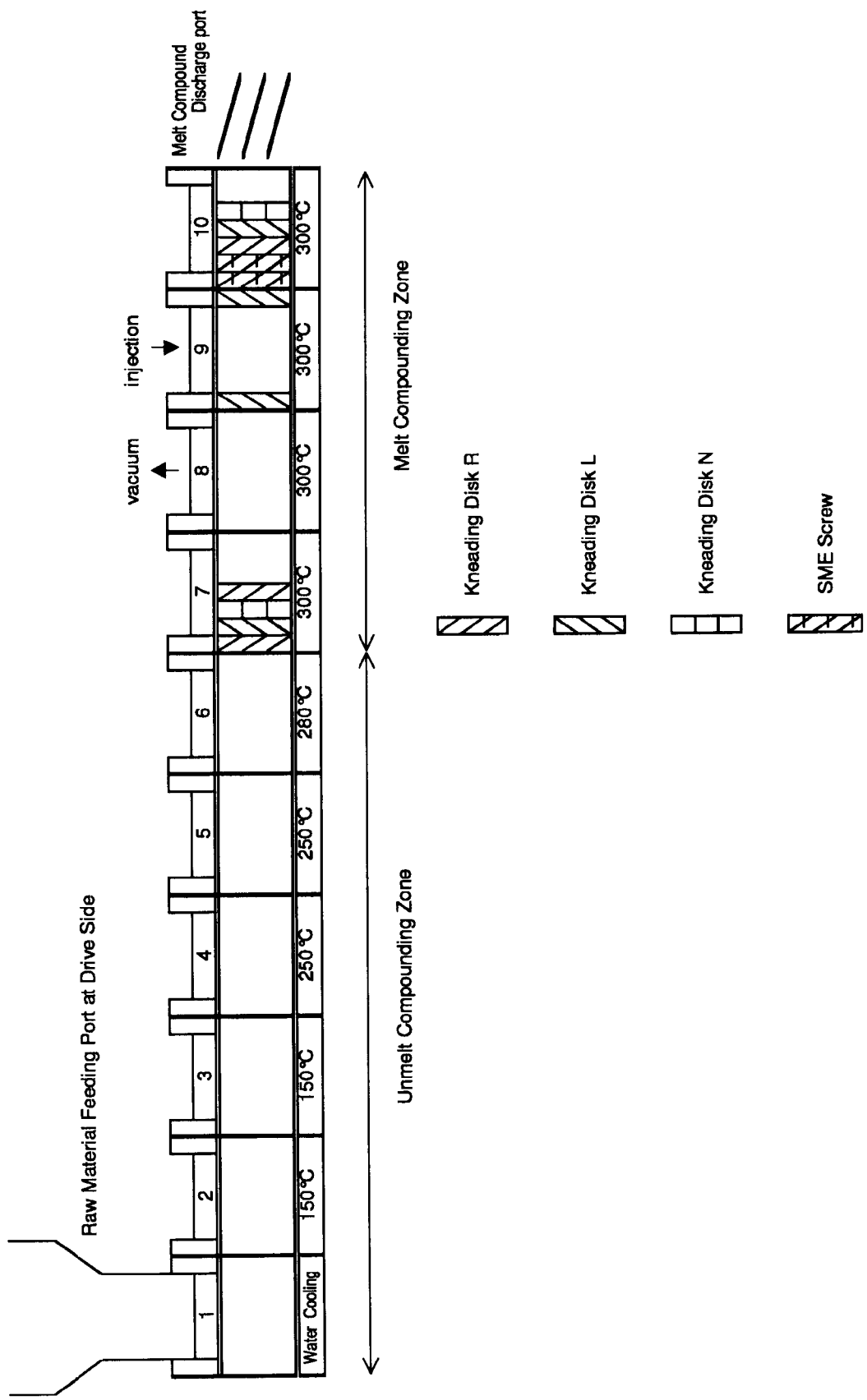

PROCESS FOR PRODUCING POLYPHENYLENE ETHER COMPOSITION

BACKGROUND OF THE INVENTION

1. Technical Field of the Invention

The present invention relates to a production process of a polyphenylene ether composition that is excellent in surface appearance of molded article, impact resistance, heat resistance, stiffness, toughness, mass productivity and production stability.

2. Related Art

For its excellent properties such as impact resistance, heat resistance, stiffness, toughness, molding processability, dimensional stability and electric properties, polyethylene ether composition has been applied to various uses such as household electrical appliances, office equipments, information equipments and automobile parts. Especially, it has been widely used for outer and inner parts of copy machines and personal computers in the field of office equipments and information equipments and various parts of peripheral devices thereof in recent years. Since high stiffness, heat resistance and dimensional stability are required, a resin composition containing an inorganic filler has been frequently used for these parts.

In general, however, it has been known that when an inorganic filler is incorporated in a resin composition, impact resistance and surface appearance of molded article are considerably deteriorated even with a small amount of the inorganic filler though stiffness and heat resistance are improved. The deterioration of these properties can be prevented by mixing a polyphenylene ether powder, an inorganic filler powder and a thermoplastic elastomer having functional group in advance and then conducting melt compounding.

On the contrary, in the case that a powder raw material is continuously fed and melt compounded in an extruder or the like for a long time, it is usually difficult to feed a large amount of powder raw material at one time to the extruder because of its high bulkiness. Further, a volatile component and water contained in the powder raw material is generated as a large amount of gas and water vapor while the material is melt compounded in the extruder, resulting in back feed of the raw material to a feeding port. Absorbing the gas or water vapor, the powder raw material forms agglomerates around the feeding port to clog it and disturb feeding of powder raw material to the extruder. As a result, extrusion of the resin becomes unstable to cause cut off of strands and make continuous extrusion operation difficult. Accordingly, polyphenylene ether resins produced according to the conventional process have not exhibited sufficient mass productivity and production stability.

As a production process of resin composition comprising a polyphenylene ether powder, there has been proposed to employ specific arrangement of powder feeding equipment and specific extrusion conditions for smooth feeding of powder raw material to an extruder to improve production stability (for example, in Patent Document 1). This process mainly focuses on improvement of mass productivity and production stability of resin composition comprising a polyphenylene ether powder, polystyrene and solid frame retardant. Therefore, it is difficult to improve mass productivity and production stability of resin composition comprising a polyphenylene ether powder and inorganic filler powder according to this process.

Further, there has been proposed a production process of resin composition wherein a specific inorganic filler and a thermoplastic elastomer are compounded into polyphenylene ether to improve impact resistance, stiffness and surface appearance of molded article (for example, in Patent Documents 2 and 3). A resin composition which is excellent in impact resistance, stiffness and surface appearance of molded article can be obtained by these production processes, but mass productivity and production stability thereof are not sufficient.

[Patent Document 1] Japanese Patent Application Laid-Open No. 2004-137447
[Patent Document 2] Japanese Patent Application Laid-Open No. 2004-263079
[Patent Document 3] Japanese Patent Application Laid-Open No. 2004-137450

SUMMARY OF THE INVENTION

Problems to be Solved by the Invention

An object of the present invention is to provide a production process of a polyphenylene ether composition that is excellent in surface appearance of molded article, impact resistance, heat resistance, stiffness, and toughness and is advantageously applicable to household electrical appliances, office equipments, information equipments and automobile parts, the process being improved in mass productivity and production stability of the polyphenylene ether composition.

Means of Solving the Problems

The present inventor has made extensive and intensive studies with a goal of stable mass production of polyphenylene ether composition that does not have adverse effect on environment, is excellent in heat resistance and stiffness and is reinforced by an inorganic filler without greatly deteriorating surface appearance of molded article, impact resistance and toughness. As a result, it has been found that the above-mentioned problems can be solved by melt compounding a raw material comprising a polyphenylene ether powder, an inorganic filler powder and a thermoplastic elastomer having functional group using a twin-screw extruder under the following conditions:

total length of barrels of the twin-screw extruder: 800 mm or longer;
  length of pre-melt compounding zone based on the total length 100% of the twin-screw extruder: 45 to 80% upstream area of the twin-screw extruder; and
  length of melt compounding zone based on the total length 100% of the twin-screw extruder: 55 to 20% downstream area of the twin-screw extruder excluding the length of pre-melt compounding zone.

According to the process of the present invention, most of water vapor and gas generated from powder raw material during melt compounding is removed while the resin composition passes through the pre-melt compounding zone. As long as the pre-melt and melt compounding zones are arranged in the prescribed range of the present invention, feeding of raw material to the extruder is not disturbed by water vapor and gas generated from the powder raw material. Thus, there occurs no troubles such that the feeding port is clogged by agglomerates of raw materials formed upon extrusion, extruded strands are not taken back efficiently, and strands are cut off. Defectiveness in taking back extruded strands is caused by that, in the extruder, gas generates from water and volatile components contained in the molten resin, mainly in the inorganic filler, and the resin is extruded in a large amount due to the pressure of gas. After the gas is discharged, an amount of the resin extruded decrease largely, a thickness of extruded strands becomes inconstant. As a result, it becomes difficult to take back strands with a taking back roll of pelletizer and pelletization itself also becomes difficult because of frequent snapping of the strand. According to the process of the present invention, the mass productivity and production stability are more remarkably improved compared to the conventional method. In addition, a polyphenylene ether composition that has a good balance of stiffness and toughness can be obtained, and the surface appearance of molded articles produced therefrom becomes superior.

Namely, the present invention provides:

1. A production process of polyphenylene ether composition comprising pre-melt compounding 20 to 98.5% by mass of a polyphenylene ether powder (I), 1 to 60% by mass of an inorganic filler powder (II) and 0.5 to 20% by mass of a thermoplastic elastomer having functional group (III), followed by melt compounding;
wherein melt compounding is conducted using a twin-screw extruder having a total length of barrels of 800 mm or longer, and a pre-melt compounding zone occupies 45 to 80% upstream area of the twin-screw extruder based on the total length 100% of the twin-screw extruder when the drive and molten compound discharging sides of the twin-screw extruder are regarded as upstream and downstream, respectively.
2. The production process according to item 1, wherein the ratio of the length of barrel (mm) to diameter of screw (mm) (L/D) is from 35 to 90.
3. The production process according to item 1, wherein the reduction rate (ignition loss) of the inorganic filler powder (II) after heated at 450° C. for 3 hours is 1 to 50% by mass based on the original.
4. The production process according to item 1, wherein 5 to 50% of the total amount of the polyphenylene ether powder (I) is side fed in the middle of the pre-melt compounding zone.
5. The production process according to item 1, wherein the inorganic filler powder (II) is a kaolin clay.
6. The production process according to item 1, wherein the inorganic filler powder (II) is a clay having a silane compound treated surface.
7. The production process according to item 1, wherein the inorganic filler powder (II) is an organically modified clay.
8. The production process according to item 1, wherein the thermoplastic elastomer having the functional group (III) is a styrene thermoplastic elastomer modified by imidazolidinone compound.
9. The production process according to item 1, further comprising 5 to 40 parts by mass of an aromatic phosphate ester (IV) based on 100 parts by mass of the total of the polyphenylene ether powder (I), the inorganic filler powder (II) and the elastomer having functional group (III).
10. The production process according to item 1, wherein the length of melt compounding zone of the twin-screw extruder is 300 to 1,620 mm.
11. A molded article formed from the polyphenylene ether composition produced by the process of item 1.
12. The molded article of item 11 is any one of office equipments, household electrical appliances, building materials, articles for daily use and automobile parts.

Effect of the Invention

According to the production process of the present invention, a water vapor and gas generated during extrusion are efficiently removed. As a result, mass productivity and production stability of the polyphenylene ether are improved remarkably. The resin composition obtained by the present invention is excellent in molding processability, surface appearance of molded article, heat resistance, impact resistance, stiffness, toughness and flame retardancy, and therefore it can be applied to various uses such as household electrical appliances, office equipments, information equipments and automobile parts.

BRIEF DESCRIPTION OF DRAWING

FIG. 1 shows an example of screw patterns, which corresponds to the one used in Example 1 of the present invention.

DETAILED DESCRIPTION OF THE INVENTION

Most Preferred Embodiment for Carrying Out the Invention

The present invention will be explained in more detail below.

A twin-screw extruder having a total length of barrels of 800 mm or longer is to be employed for sufficient melt compounding of a polyphenylene ether powder (I) and an inorganic filler powder (II). The total length of barrels is preferably 1500 to 8000 mm, more preferably 2000 to 5000 mm, specifically preferably 3000 to 4000 mm. The total length of barrels means a length from the outer end of drive side to the outer end of a molten compound discharging side of the twin-screw extruder.

The term "upstream" of the twin-screw extruder means a drive side of the twin-screw extruder, and the term "downstream" of the twin-screw extruder means a molten compound discharging side of the twin-screw extruder. The pre-melt compounding zone is necessary to occupy 45 to 80% upstream area of the twin-screw extruder in proportion to the total length of barrels. The pre-melt compounding zone in the present invention means a zone where the polyphenylene ether powder (I) is prevented from melting and flows downstream while mixing with other raw materials. The range of the pre-melt compounding zone is preferably 50 to 70%, more preferably 50 to 60% upstream area of the twin-screw extruder in proportion to the total length of barrels. From the viewpoint of mass productivity, production stability and maintenance of physical properties of the composition, the pre-melt compounding zone is necessary to occupy 45% or more of the extruder. From the viewpoint of sufficient melt compounding of the polyphenylene ether powder (I), the inorganic filler powder (II) and the thermoplastic elastomer having functional group (III), it is necessary to occupy 80% or less of the extruder.

In the pre-melt compounding zone, it is preferable to use only a feed screw such as a single thread clockwise screw and a double thread clockwise screw for an extrusion screw and to arrange screws so as to prevent shear and feed the composition efficiency. Particularly, to improve efficiency of feeding, preferred is a single thread clockwise screw, of which length is 1.0 to 1.5 times of its diameter.

Further, in the pre-melt compounding zone, a temperature of barrels is preferably adjusted to 0 to 280° C. It is preferable to set the first barrel with a first feeding port for the raw material at 100° C. or lower and the second and third barrels each at 200° C. or lower. The temperature of the first barrel may be controlled by water flow. In this case, an amount of water flow is controlled so as to keep the temperature of the first barrel from 10 to 40° C.

The zone between the end of pre-melt compounding zone and the molten compound discharge port is to be a melt compounding zone for melting the polyphenylene ether powder (I) and compounding with the other raw materials sufficiently. In the present invention, the phrase "melt of the polyphenylene ether powder (I)" means that the polyphenylene ether powder (I) in the raw materials to be extruded changes its properties from powder aspect to a molten resin aspect.

The phrase "the starting point of the melt compounding zone" means the upstream end of a most upstream barrel among the barrels having screws to facilitate compounding the resin. The pre-melt compounding zone and the melt compounding zone are distinguished distinctly. There can be arranged kneading disks L, N and R, an anti-clockwise screw, an SME screw, and a ZME screw in the melt compounding zone. These screws can be appropriately combined and arranged in the barrels according to a mass ratio of the polyphenylene ether powder (I), the inorganic filler powder (II) and the thermoplastic elastomer having functional group (III), and a kind of the inorganic filler powder (II). The temperature of barrels can be set at 330 to 250° C.

The melt compounding zone occupies 55 to 20% downstream area of the twin-screw extruder in proportion to the total length of barrels, preferably 50 to 30%, more preferably 50 to 40%. To achieve sufficient mass productivity, production stability and physical properties of the composition, the melt compounding zone is necessary to occupy 55% or less of the extruder. To melt compound the polyphenylene ether powder (I), the inorganic filler powder (II) and the thermoplastic elastomer having functional group (III), it is necessary to occupy 20% or more of the extruder.

A ratio of the barrel length (mm) to the screw diameter (mm) (L/D) of the extruder to be used is preferably from 35 to 90, more preferably 40 to 70, furthermore preferably 40 to 60. The preferred ratio is from 35 to 90 from the viewpoint of sufficient mass productivity and production stability.

The length of the melt compounding zone is preferably 200 mm or longer for sufficient melt compounding. From the viewpoint of heat deterioration of resin component, it is preferably 2600 mm or shorter. More preferred is from 300 to 1620 mm.

In order to conduct mass production, the diameter of the screw is preferably 40 to 110 mm, more preferably 50 to 90 mm. The screw diameter of 40 mm or more is preferable for sufficient mass productivity. The screw diameter of 110 mm or less is preferred from the viewpoint of impact resistance, toughness and production stability.

A decompression vent is arranged in a barrel located downstream of the first barrel of the melt compounding zone. Mass productivity and production stability is further improved by deaerating gas from the decompression vent, which generates during the melt compounding. The decompression vent reduces the pressure in the extruder to 0.08 MPa or less. The decompression vent can be arranged at 2 or more locations.

The temperature of the resin composition extruded from outlet of die of the twin-screw extruder is preferably less than 370° C. from the viewpoint of impact resistance and surface appearance of molded article. It is more preferably less than 360° C., furthermore preferably less than 350° C.

As the polyphenylene ether powder (I), there can be used a polymer comprising constituent units represented by the following formulas (1) and/or (2). The polyphenylene ether powder (I) may be a homopolymer comprising constituent units represented by the following formula (1) or (2) or a copolymer including constituent units represented by the following formula (1) and/or (2):

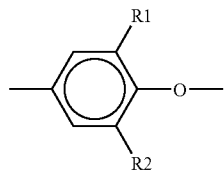

(1)

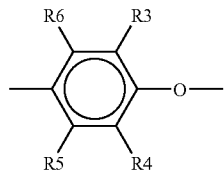

(2)

wherein each of R1, R2, R3, R4, R5 and R6 independently represents a monovalent residue such as an alkyl group having 1 to 4 carbon atoms, an aryl group, a halogen atom or a hydrogen atom, with the proviso that R5 and R6 are not simultaneously hydrogen atoms.

Representative examples of polyphenylene homopolymer include homopolymers such as poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloroethyl-1,4-phenylene)ether, and poly(2-methyl-6-hydroxyethyl-1,4-phenylene)ether.

Polyphenylene ether copolymers include polyphenylene ether copolymers, of which main structure is a polyphenylene ether structure, for example, a copolymer of 2,6-dimethylphenol and 2,3,6-trimethylphenol, a copolymer of 2,6-dimethylphenol and o-cresol, or a copolymer of 2,3,6-trimethylphenol and o-cresol.

Further, the polyphenylene ether may contain various other phenylene ether units as a structure unit in the range wherein the effect of the present invention is not deteriorated. The phenylene ether units include, for example, a 2-(dialkylaminomethyl)-6-methylphenylene ether unit, a 2-(N-alkyl-N-phenylaminomethyl)-6-methylphenylene ether unit, and the like, which are disclosed in JP-A-01-297428 and JP-A-63-301222.

Also, a small amount of diphenoquinone or the like may be bonded to the main chain of the polyphenylene ether.

The polyphenylene ether powder (I) may be a functionalized polyphenylene ether, which is produced by modifying a part or the whole of polyphenylene ether with an unsaturated carboxylic acid or a functional derivative thereof. In such a case, the polyphenylene ether may be modified by sole or combination of an unsaturated carboxylic acid or a derivative thereof.

A particle size of the polyphenylene ether powder (I) is an average particle diameter of preferably 1 to 1000 μm, more preferably 10 to 700 μm, particularly preferably 100 to 500 μm. From the viewpoint of handling at processing, an diameter of 1 μm or more is preferable. To achieve sufficiently fine dispersion of inorganic filler by melt compounding, a diameter of 1000 μm or less is preferable.

An intrinsic viscosity of the polyphenylene ether powder (I), as measured using a chloroform solution having a temperature of 30° C., is preferably 0.3 to 0.9, more preferably 0.4 to 0.6. To achieve sufficiently fine dispersion of inorganic filler by melt compounding, an intrinsic viscosity of 0.3 or more is preferable. From the viewpoint of molding processability, an intrinsic viscosity of 0.9 or less is preferable.

An amount of the polyphenylene ether powder (I) to be added is 20 to 98.5% by mass, preferably 30 to 90% by mass, more preferably 50 to 70% by mass. The amount of 20% by mass or more is preferred from the viewpoint of impact resistance and surface appearance of molded article. The amount of 98.5% by mass or less is preferred from the viewpoint of stiffness.

A production process of composition more preferably comprises a step of side feeding 5 to 50%, preferably 10 to 30% of the total amount of the polyphenylene ether powder (I) in the middle of the pre-melt compounding zone of the twin-screw extruder. A desirable side feed amount is 5% or more for sufficient improvement in mass productivity, production stability and physical properties of the composition. A side feed amount of 50% or less is desirable for smooth side feeding, i.e., production stability.

The inorganic filler powder (II) contains one or more of inorganic fillers which are generally used to reinforce a thermoplastic resin. Representative examples of the inorganic filler include silica, wollastonite, alumina, talc, mica, clays, titanium oxide, zinc oxide, iron oxide, calcium carbonate, barium sulfate, and the like. Of these, a mineral filler such as talc, mica and clays is preferred to achieve the object of the present invention. Particularly preferred are a kaolin clay and an organically modified clay in the clays. The organically modified clay is a layered silicate mineral such as montmorillonite and hectorite, of which interlayers are organically modified with an organification agent such as quaternary ammonium compound and quaternary phosphonium compound.

A particle size of primary particle of the inorganic filler powder (II) is an average particle diameter of preferably 0.001 to 10 μm, more preferably 0.01 to 2 μm, particularly preferably 0.05 to 0.5 μm. A particle size of 10 μm or less is preferred from the viewpoint of impact resistance and surface appearance of molded article. A particle size of 0.001 μm or more is preferred from the viewpoint of stiffness.

An ignition loss of the inorganic filler powder (II) is preferably 60% by mass or less, more preferably 1 to 50% by mass, furthermore preferably 1 to 30% by mass, particularly preferably 3 to 10% by mass. The term "ignition loss" herein means a mass which is removed by evaporation or decomposition of water or organic components adhered mainly on surface or interlayer of the inorganic filler powder particle. The water and organic components are evaporate or decomposed by heating the inorganic filler in an electric furnace at 450° C. for 3 hours. The ignition loss is expressed by a reduction rate of a mass of the post-heated inorganic filler to a mass of the pre-heated inorganic filler, the mass being obtained by measuring the inorganic fillers before and after heating. The ignition loss of the inorganic filler powder (II) of 60% by mass or less is preferred from the viewpoint of sufficient mass productivity and production stability.

For improvement of dispersibility in the composition and adhesion property to the resin, it is preferable to employ the inorganic filler powder (II), of which surface is treated with a treating agent such as a silane compound in advance. Representative examples of a silane treating agent include vinyl silane compounds such as vinyltrichlorosilane, vinyltriethoxysilane and γ-methacryloxypropyltrimethoxysliane; epoxy silane compounds such as γ-glycidoxypropyltrimethoxysilane; sulfur silane compounds such as bis-(3-triethoxysilylpropyl)tetrasulfide; mercaptosilane compound such as γ-mercaptopropyltrimethoxysilane; aminosilane compounds such as γ-aminopropyltriethoxysilane and γ-ureido propyltriethoxysilane; and the like. The preferred compounds to achieve the purpose of the present invention are mercaptosilane compounds and aminosilane compounds, and more preferred is mercaptosilane compounds. The silane compound may be used individually or in combination. Inorganic fillers, of which surface is treated with different silane compound, may be mixed. Together with the inorganic fillers having a silane compound treated surface, an inorganic filler having a surface treated with a surface treating agent other than the silane compounds or untreated may be used.

The amount of the inorganic filler powder (II) to be added is selected from the range of 1 to 60% by mass, preferably 5 to 50% by mass, more preferably 10 to 30% by mass. The amount of 60% by mass or less is preferred from the viewpoint of impact resistance and surface appearance of molded article. The amount of 1% by mass or more is preferred from the viewpoint of stiffness.

The thermoplastic elastomer having a functional group (III) includes styrene thermoplastic elastomer, olefin thermoplastic elastomer, urethane thermoplastic elastomer, polyester thermoplastic elastomer, polyamide thermoplastic elastomer, polybutadiene thermoplastic elastomer, fluorine thermoplastic elastomer, and the like. Of these, styrene thermoplastic elastomer is most suitably employed in the present invention. The styrene thermoplastic elastomer indicates a block copolymer having a polystyrene block and a rubber block. The rubber block includes polybutadiene, polyisoprene, poly(ethylene-butylene), poly(ethylene-propylene), vinyl-polyisoprene, and the like. The rubber block may be used in combination thereof. The rubber blocks may be arranged in either linear arrangement or a radial arrangement. The block structure composed of the polystyrene block and the rubber block may be any one of an SB structure, an SBS structure and an SBSB structure. A linear block copolymer having an SBS structure composed of polystyrene-poly(ethylene/butylene)-polystyrene is particularly preferable to achieve the object of the present invention. Further, a butadiene unit may be contained in the rubber block within a range not exceeding 30% by mass.

A functional group of the thermoplastic elastomer having a functional group (III) is preferably a carbonyl group or an amino group from the viewpoint of impact resistance and surface appearance of molded article. A carbonyl group is introduced by modifying the thermoplastic elastomer with an unsaturated carboxylic acid or a functional derivative thereof. The unsaturated carboxylic acid and functional derivative thereof include maleic acid, fumaric acid, itaconic acid, halogenated maleic acid, cis-4-cyclohexene-1,2-dicarboxylic acid, endo-cis-bicyclo[2,2,1]-5-heptene-2,3-dicarboxylic acid and the like; anhydride, ester, amid, imide or the like of the dicarboxylic acids; acrylic acid, methacrylic acid and the like; ester, amid or the like of the monocarboxylic acids; and the like. An amino group is introduced into the thermoplastic elastomer by reacting with imidazolidinone compound or pyrrolidone compound.

The imidazolidinone compound includes 1,3-diethyl-2-imidazolidinone, 1,3-dimethyl-2-imidazolidinone, 1,3-dipropyl-2-imidazolidinone, 1-methyl-3-ethyl-2-imidazolidionone, 1-methyl-3-propyl-2-imidazolidinone, 1-methyl-3-butyl-2-imidazolidinone, 1-methyl-3-(2-methoxyethyl)-2-imidazolidionone, 1-methyl-3-(2-ethylxyethyl)-2-imidazolidione, 1,3-di-(2-ethoxyethyl)-2-imidazolidinone, 1,3-dimethylethlene thiourea, N,N'-diethylpropylene urea, 1,3-dimethyl-3,4,5,6-tetrahydro-2(1H)-pyrimidinone, and the like. Of these, 1,3-dimethyl-2-imidazolidionone is preferred.

The pyrrolidone compounds include 1-cyclohexyl-2-pyrrolidone, 1-methyl-2-pyrrolidone, 1-ethyl-2-pyrrolidone, 1-propyl-2-pyrrolidone, 1-butyl-2-pyrrolidone, 1-isopropyl-2-pyrrolidone, 1,5-dimethyl-2-pyrrolidone, 1-methoxymethyl-2-pyrrolidone, 1-methyl-2-piperidone, 1,4-dimethyl-2-piperidone, 1-ethyl-2-piperione, 1-isopropyl-2-piperidone, 1-isopropyl-5,5-dimethyl-2-piperione, and the like. Of these, 1-methyl-2-pyrrolidone and 1-methyl-2-piperidone are preferred. Particularly preferred is 1-methyl-2-piperidone.

The thermoplastic elastomer having a functional group (III) is preferably fed from a raw material feeding port at the drive side to the extruder from the viewpoint of stiffness of composition, mass productivity and production stability.

The amount of thermoplastic elastomer having a functional group (III) to be added is selected within a range of 0.5 to 20% by mass, preferably 1 to 15% by mass, more preferably 3 to 10% by mass. The amount of 0.5% by mass or more is preferred from the viewpoint of impact resistance and surface appearance of molded article. The amount of 20% by mass or less is preferred from the viewpoint of stiffness and heat resistance.

The aromatic ester phosphate (IV) may be used when molding processability, flame retardance and the like are required. For example, aromatic ester phosphates substituted with phenyl such as triphenylphosphate, tricresylphosphate, trixylenylphosphate, cresyldiphenylphosphate, xylenyldiphenylphosphate, dixylenylphenylphosphate, hydroxynone bisphenol, resorcinol bisphosphate, and bisphenol A bisphosphate are most suitably employed. These compounds may be used individually or in combination.

The amount of the aromatic ester phosphates (IV) to be added is selected within a range of 5 to 40 parts by mass based on 100 parts by mass of the total amount of the polyphenylene ether powder (I), the inorganic filler powder (II) and the thermoplastic elastomer having functional group (III). It is preferably 8 to 30 parts by mass, more preferably 10 to 20 parts by mass. The amount of 5 parts by mass or more is preferred from the viewpoint of flame retardance. The amount of 40 parts by mass or less is preferred from the viewpoint of heat resistance.

The styrene resin (V) can be added to the polyphenylene ether composition obtained by the production process of the present invention as needed. The styrene resin used in the present invention is a polymer obtained by polymerizing styrenes, or styrenes and a compound copolymerizable therewith in the presence or absence of a rubbery polymer.

The styrenes means a compound represented by the general formula (3):

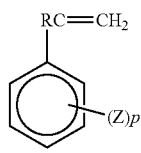

(3)

wherein R represents a hydrogen group, an alkyl group having 1 to 4 carbon atoms, or a halogen group; Z is selected from the group consisting of a vinyl group, a hydrogen group, a halogen group, and an alkyl group having 1 to 4 carbon atoms; and p represents an integer of 0 to 5.

Representative examples of styrenes include styrene, α-methylstyrene, 2,4-dimethylstyrene, monochlorostyrene, p-methylstyrene, p-tert-butylstyrene, ethylstyrene, and the like. Further, compounds copolymerizable with styrenes include methacrylic acid esters such as methylmethacrylate and ethylmethacrylate; unsaturated nitrile compounds such as acrylonitrile and methacrylonitrile; acid anhydrides such as maleic anhydride; and the like. These compounds are used with styrenes.

The rubbery polymer includes a conjugated diene rubber, a copolymer of conjugated diene and aromatic vinyl compound, hydrogenated thereof, an ethylene-propylene copolymer rubber, and the like. Particularly preferable styrene resin of the present invention is a polystyrene or rubbery reinforced styrene resin.

Further, to the polyphenylene ether composition obtained by the production process of the present invention, stabilizers such as an antioxidant, an ultraviolet absorber, a heat stabilizer, a colorant and a mold release agent can be added as needed.

When the polyphenylene ether composition obtained by the production process of the present invention is formed into a molded article, a molding process is not particularly limited. The widely known molding processes such as injection molding, extrusion molding, vacuum molding and compression molding are advantageously employed.

EXAMPLES

The present invention will be described with reference to the following Examples and Comparative Examples, which should not be construed as limiting the scope of the present invention.

In Examples and Comparative Examples, evaluation of physical properties and measurement of various values were conducted by the following methods.

(1) Production Stability

At the start of operation, an extrusion rate, at which the powder raw material was fed into the extruder smoothly, was checked. The production stability was evaluated as follows:

Good: No trouble occurred for 4 hours or more after the start of operation.

Poor: Extrusion was stopped by some trouble within 4 hours after the start of operation.

(2) Tensile Elongation (Toughness)

Tensile elongation (strain at break (%)) was measured under the following conditions.

Sample: Tensile test piece having the configuration determined by ASTM
    D-638 (Form I)
Chuck interval: 115 mm
Gage interval: 50 mm
Tensile test speed: 5 mm/min (3) Drop (Dart) Impact Strength (Impact Resistance)

The total absorption energy at break was measured under the following conditions.

Sample: Flat plate having a size of 50 mm×90 mm×2.5 mm (thickness)
Measuring instrument: prop graphic impact tester manufactured by Toyo Seiki Seisaku-sho, Ltd.
Measurement temp.: 23° C.

(4) Notched Izod Impact Value (Impact Resistance)
Standard: ASTM D256
Measurement temp.: 23° C.

(5) Flexural Strength and Flexural Modulus
Standard: ASTM D790
Test method: Triangular bending test
Measurement temp.: 23° C.

(6) Gloss
Gloss in the center of a flat plate was measured under the following conditions.
Sample: Flat plate having a size of 50 mm×90 mm×2.5 mm (thickness)
Measuring instrument: Glossmeter GM-26D manufactured by Murakami Color Research Laboratory
Measurement angle: 60°
(7) Surface Appearance
Surface appearance was visually observed under the following conditions.
Sample: Flat plate having a size of 50 mm×90 mm×2.5 mm (thickness)
(8) Flammability
Sample: Test piece having a thickness of 1.6 mm
Standard: UL-94 (standard defined by Underwriters Laboratories Inc., USA)
(9) Burning Dripping Property
Sample: Test piece having a thickness of 2.0 mm
Standard: UL-94 (standard defined by Underwriters Laboratories Inc., USA)
Test method: 5VA method
Raw Material 1: Polyphenylene Ether Powder (I)
(I-1) Poly(2,6-dimethyl-1,4-phenylene)ether having an intrinsic viscosity of 0.47 dl/g as measured using a chloroform solution having a temperature of 30° C. (trade name: S201A, manufactured by Asahi Kasei Chemicals Corp.)
Raw Material 2: Inorganic Filler Powder (II)
(II-1) Clay with mercapto silane treated surface and an average particle diameter of 0.2 μm (trade name: Nucap 290, manufactured by J. M. Huber Corp., U.S.), having an ignition loss of 5.6% by mass
(II-2) Clay organically modified by methyl benzyl hydrogenated ditalo ammonium (trade name: Bentone 2010, manufactured by Elementis Specialties, Inc., U.S.), having an ignition loss of 37% by mass
Raw Material 3: Thermoplastic Elastomer Having Functional Group (III)
(III-1) Styrene thermoplastic elastomer having an amino group
In a reactor equipped with a stirrer, which was purged with a nitrogen gas, polymerization was conducted using a cyclohexane as a solvent and n-butyl lithium as a polymerization initiator to obtain a block copolymer having a polystyrene-polybutadiene-polystyrene structure, which had a number average molecular weight of 40,000, 30% by mass of styrene units, 1,2-vinyl bond content in the butadiene units of 38% based on the total butadiene unit bonds, and a living lithium ion structure at polymer chain terminals. After completion of polymerization, 1,3-dimethyl-2-imidazolidinone was added in an amount of 1.5 molar times the lithium ion of the n-butyl lithium used and allowed to react at 95° C. for 10 minutes. Then, a hydrogenation reaction was subsequently carried out according to the method described in U.S. Pat. No. 4,501,857, thereby obtaining a polymer having a hydrogenation rate of 81.6% based on the total amount of the butadiene unit bonds before the polymerization. To the polymer solution after the hydrogenation reaction was added 2,6-di-tert-butyl-p-crezol as a thermal deterioration stabilizer in an amount of 0.3 g per 100 g of the polymer to remove the solvent of cyclohexane by heating. As a result, there obtained a styrene based thermoplastic elastomer having a polystyrene-hydrogenated polybutadiene-polystyrene structure, in which a secondary amine was added to the polystyrene chain terminals thereof.

(III-2) Styrene Thermoplastic Elastomer Having a Carbonyl Group
100 parts of styrene thermoplastic elastomer (trade name: Tuftec H1041, manufactured by Asahi Kasei Chemicals Corp.), 1.0 part of maleic anhydride and 0.5 parts of Perbutyl D (manufactured by NOF Corp.) were mixed uniformly. Then, the mixture was melt compounded at 260° C. by using an extruder to obtain a styrene thermoplastic elastomer having a functional group. The amount of maleic anhydride added to the H1041 was 0.4 parts as measured by titration with sodium methylate.
Raw Material 4: Aromatic Phosphoric Ester (IV)
(IV-1) Bisphenol A bisdiphenylphosphate (trade name: CR741; manufactured by Daihachi Chemical Industry Co., Ltd.)
Raw Material 5: Styrene Resin (V)
(V-1) High impact polystyrene (trade name: PS6200; manufactured by NOVA Chemicals Corp., U.S.)
(V-2) General purpose polystyrene (trade name: Styron 660; manufactured by Dow Chemical Co., U.S.)
(V-3) Styrene-Acrylonitorile copolymer (trade name: T9701; manufactured by Asahi Kasei Chemicals Corp.)
Twin-Screw Extruder
(T-1) ZSK 25 twin-screw extruder (manufactured by Werner & Pfleiderer, number of barrels: 10, screw diameter: 25 mm, total barrel length: 1080 mm)
(T-2) ZSK 58 twin-screw extruder (manufactured by Werner & Pfleiderer, number of barrels: 13, screw diameter: 58 mm, total barrel length: 3220 mm)
(T-3) ZSK 58 MC twin-screw extruder (manufactured by Werner & Pfleiderer, number of barrels: 13, screw diameter: 58 mm, total barrel length: 3220 mm)
(T-4) TEM 75 SS twin-screw extruder (manufactured by Toshiba Machine Co. Ltd., number of barrels: 13, screw diameter: 75 mm, total barrel length: 3910 mm)

Example 1

The polyphenylene ether powder (I-1), the inorganic filler powder (II-1) and the thermoplastic elastomer having functional group (III-1) were fed into the twin-screw extruder (T-1) from a raw material feeding port arranged at the drive side in amounts shown in Table 1. Then, the aromatic phosphoric ester flame retardant (IV-1) was fed as liquid to conduct extrusion. Detailed extrusion conditions are shown in Table 1. In the table, each of the alphabets shown together with barrel temperature indicates as follows: 'b' indicates a barrel equipped with a decompression (0.9 MPa) vent, 'a' indicates a barrel where an aromatic phosphoric ester flame retardant (IV-1) was fed as liquid, and 's' indicates a barrel where the polyphenylene ether powder (I-1) was side fed. Screw patterns of each barrel are also shown in Table. In the table, 'R' indicates a kneading disk R, 'L' a kneading disk L, 'N' a neutral kneading disk, and 'SME' a standard mixing element screw. The screw pattern in the table is described in screw arrangement order from upstream to downstream in each barrel. In the barrel 9, screws were arranged at both sides of the barrel so as not to disturb liquid feeding. A screw pattern corresponding to Example 1 is shown in FIG. 1. Mass productivity and production stability of the obtained resin composition were evaluated. Physical properties of samples taken in the middle of the operation period were evaluated. Sample resin compositions in the form of pellets were dried in a drying machine at 100° C. for 2 hours, and then injection molded into a test piece. Molding conditions were as follows:

Molding machine: IS-80C injection molding machine (manufactured by Toshiba Machine Co. Ltd.)
Molding temperature:
   Cylinder 1: 240° C.
   Cylinder 2: 260° C.
   Cylinder 3: 280° C.
   Cylinder 4: 280° C.
Mold temperature: 80° C.
The evaluation results are shown in Table 1.

Example 2 to Example 16

Resin compositions were produced according to the same method as in Example 1 under the conditions shown in Tables 1 to 4. Mass productivity, production stability and physical properties in each Examples are shown in the tables.

Comparative Example 1 to Comparative Example 13

Resin compositions were produced according to the same method as in Example 1 under the conditions shown in Tables 5 to 7. In Comparative Example 4, concentrate (pellet) obtained by melt compounding the polyphenylene ether powder (I-1) and the aromatic phosphoric ester flame retardant (IV-1) by a twin-screw extruder was employed. In the case that feeding up occurred to stop the operation, the period from start to stop of operation is shown as an operation stopping time in the tables. In Comparative Examples 4, 7, 8, 9, 10, 11, 12 and 13 among the comparative examples wherein good production stability was not exhibited, restart and stop of the operation were repeated for the operation period shown in the Tables. Mass productivity, production stability and physical properties of samples taken in the middle of the operation are shown in the Tables.

In the extruded resins of Comparative Examples 1, 2, 5, 6, 7, 8, 10, 11 and 12, black spots owing to burn resin were found. In the extruded resin of Comparative Examples 4, 9 and 13, agglomerates caused by insufficient dispersion of the inorganic filler powder were found.

In Comparative Example 3, physical properties of a sample taken when the operation of Comparative Example 2 was stopped are shown in the Tables.

In Comparative Example 7, extrusion was conducted at an extrusion rate of 200 kg/hr at the start of operation, and resumed at 150 kg/hr after the stop of operation.

In Comparative Example 13, an extrusion was changed from 1000 kg/hr, which was the rate at the start of operation, to 850 kg/hr 10 minutes after the start of operation, and at the same time, a screw rotating speed was also changed from 550 rpm to 650 rpm for the purpose of reducing a pre-melt portion in the resin. However, it failed to suppress generation of agglomerates.

TABLE 1

|  | Ex. 1 | Ex. 2 | Ex. 3 | Ex. 4 |
|---|---|---|---|---|
| Total Barrel Length of Extruder (mm) | 1080 | 1080 | 3220 | 3220 |
| Pre-melt Compounding Zone (%) | 62 | 48 | 50 | 61 |
| Length of Melt Compounding Zone | 410 | 562 | 1610 | 1256 |
| Twin Screw Extruder | T-1 | T-1 | T-2 | T-3 |
| Number of Barrels | 10 | 10 | 13 | 13 |
| Screw Rotation Speed (rpm) | 480 | 480 | 500 | 600 |
| Operation Period (h) | 4 | 4 | 5 | 10 |
| Extrusion Rate (kg/hr) | 40 | 30 | 400 | 500 |
| Resin Temp. at Die Port (° C.) | 315 | 315 | 340 | 340 |
| Compound (part by mass) Top Feed | | | | |
| PPE Powder (A-1) | 71 | 73 | 72 | 72 |
| Silane Treated Clay (B-1) | 23 | 15 | 21 | 21 |
| Aminodized HTR (C-1) | 6 | 12 | 7 | 7 |
| Side Feed | | | | |
| HIPS (E-1) | — | 30 | — | — |
| GPPS (E-2) | — | 11 | — | — |
| AS (E-3) | — | 11 | — | — |
| Liquid Feed | | | | |
| CR741 (D-1) | 18 | — | 19 | 19 |
| Physical Property | | | | |
| Tensile Elongation (%) | 90 | 112 | 98 | 99 |
| Dart (J) | 42 | 42 | 49 | 47 |
| Notched Izod Impact Strength (J/m) | 72 | 87 | 117 | 115 |
| Flexural Strength (Mpa) | 115 | 82 | 110 | 112 |
| Flexural Modulus (Mpa) | 3600 | 2620 | 3370 | 3400 |
| Gloss (%) | 84 | 85 | 90 | 88 |
| Appearance of Molded Article | GOOD | GOOD | GOOD | GOOD |
| Flammability (UL94) | V-1 | — | V-0 | V-0 |
| Burning Dripping Proofness (5VA) | Acceptable | — | Acceptable | Acceptable |
| Production Stability | GOOD | GOOD | GOOD | GOOD |
| Barrel Temp (degree C.)/Vent (b), Liquid Feed (a), Side Feed (s) Position | | | | |
| Barrel 1 | Water cooling | Water cooling | Water cooling | Water cooling |
| Barrel 2 | 150 | 200 | 100 | 100 |
| Barrel 3 | 150 | 200 | 100 | 100 |
| Barrel 4 | 250 | 280 | 150 | 100 |
| Barrel 5 | 250 | 280 | 280 | 200 |
| Barrel 6 | 280 | 280/s | 280 | 200 |
| Barrel 7 | 300 | 300 | 300 | 250 |
| Barrel 8 | 300/b | 270/b | 300 | 280 |
| Barrel 9 | 300/a | 270 | 270/b | 300/b |

TABLE 1-continued

|  | Ex. 1 | Ex. 2 | Ex. 3 | Ex. 4 |
|---|---|---|---|---|
| Barrel 10 | 300 | 270 | 270 | 270 |
| Barrel 11 | — | — | 270/b | 270 |
| Barrel 12 | — | — | 270/a | 270/a |
| Barrel 13 | — | — | 270 | 270 |
| SCREW PATTERN | | | | |
| Barrel 1 | | | | |
| Barrel 2 | | | | |
| Barrel 3 | | | | |
| Barrel 4 | | | | |
| Barrel 5 | | R, L, N | | |
| Barrel 6 | | | | |
| Barrel 7 | R, L, N, R | R, L | R, R, N, L | |
| Barrel 8 | | | | R, R, N, L |
| Barrel 9 | L, L, SME, SME, | L, SME, SME, | | |
| Barrel 10 | R, L, N | R, R, N | L, N | L |
| Barrel 11 | — | — | | |
| Barrel 12 | — | — | L | L |
| Barrel 13 | — | — | SME, SME, SME, SME, R | SME, SME, R, R |

TABLE 2

|  | Ex. 5 | Ex. 6 | Ex. 7 | Ex. 8 |
|---|---|---|---|---|
| Total Barrel Length of Extruder (mm) | 3220 | 3220 | 3220 | 3220 |
| Pre-melt Compounding Zone (%) | 70 | 50 | 50 | 50 |
| Length of Melt Compounding Zone | 966 | 1610 | 1610 | 1610 |
| Twin Screw Extruder | T-3 | T-3 | T-3 | T-2 |
| Number of Barrels | 13 | 13 | 13 | 13 |
| Screw Rotation Speed (rpm) | 650 | 520 | 400 | 520 |
| Operation Period (h) | 10 | 10 | 10 | 5 |
| Extrusion Rate (kg/hr) | 650 | 400 | 350 | 600 |
| Resin Temp. at Die Port (° C.) | 335 | 340 | 337 | 340 |
| Compound (part by mass) | | | | |
| Top Feed | | | | |
| PPE Powder (A-1) | 72 | 72 | 72 | 58 |
| Silane Treated Clay (B-1) | 21 | 21 | 21 | 17 |
| Aminodized HTR (C-1) | 7 | — | 7 | 6 |
| Maleindized HTR (C-2) | — | 7 | — | — |
| Side Feed | | | | |
| PPE Powder (A-1) | — | — | — | 19 |
| Liquid Feed | | | | |
| CR741 (D-1) | 19 | 19 | 19 | 15 |
| Physical Property | | | | |
| Tensile Elongation (%) | 92 | 74 | 75 | 125 |
| Dart (J) | 45 | 38 | 45 | 53 |
| Notched Izod Impact Strength (J/m) | 115 | 69 | 113 | 123 |
| Flexural Strength (Mpa) | 114 | 111 | 111 | 112 |
| Flexural Modulus (Mpa) | 3450 | 3390 | 3390 | 3420 |
| Gloss (%) | 86 | 90 | 88 | 94 |
| Appearance of Molded Article | GOOD | GOOD | GOOD | GOOD |
| Flammability (UL94) | V-0 | V-1 | V-0 | V-0 |
| Burning Dripping Proofness (5VA) | Acceptable | Acceptable | Acceptable | Acceptable |
| Production Stability | GOOD | GOOD | GOOD | GOOD |
| Barrel Temp (degree C.)/Vent (b), Liquid Feed (a), Side Feed (s) Position | | | | |
| Barrel 1 | Water Cooling | Water Cooling | Water Cooling | Water Cooling |
| Barrel 2 | 100 | 100 | 100 | 100 |
| Barrel 3 | 100 | 100 | 100 | 100 |
| Barrel 4 | 100 | 150 | 150 | 150 |
| Barrel 5 | 100 | 250 | 250 | 250/s |
| Barrel 6 | 100 | 250 | 250 | 280 |
| Barrel 7 | 200 | 280 | 280 | 300 |
| Barrel 8 | 250 | 300 | 300 | 300 |
| Barrel 9 | 280 | 270/b | 270/b | 270/b |
| Barrel 10 | 300 | 270 | 270 | 270 |
| Barrel 11 | 270/b | 270/b | 270/b | 270/b |
| Barrel 12 | 270/a | 270/a | 270/a | 270/a |
| Barrel 13 | 270 | 270 | 270 | 270 |

TABLE 2-continued

|  | Ex. 5 | Ex. 6 | Ex. 7 | Ex. 8 |
|---|---|---|---|---|
| SCREW PATTERN | | | | |
| Barrel 1 | | | | |
| Barrel 2 | | | | |
| Barrel 3 | | | | |
| Barrel 4 | | | | |
| Barrel 5 | | | | |
| Barrel 6 | | | | |
| Barrel 7 | | R, R, N, L | R, R, N, L | R, R, N, L |
| Barrel 8 | | | | |
| Barrel 9 | | | | |
| Barrel 10 | R, R, N, L | L | L | L, N |
| Barrel 11 | | | | |
| Barrel 12 | L | L | L | L |
| Barrel 13 | SME, SME, R, R | SME, SME, R, R | SME, SME, R, R | SME, SME, SME, SME, R |

TABLE 3

|  | Ex. 9 | Ex. 10 | Ex. 11 | Ex. 12 |
|---|---|---|---|---|
| Total Barrel Length of Extruder (mm) | 3220 | 3220 | 3220 | 3220 |
| Pre-melt Compounding Zone (%) | 50 | 50 | 50 | 70 |
| Length of Melt Compounding Zone | 1610 | 1610 | 1610 | 966 |
| Twin Screw Extruder | T-2 | T-2 | T-2 | T-3 |
| Number of Barrels | 13 | 13 | 13 | 13 |
| Screw Rotation Speed (rpm) | 520 | 520 | 520 | 550 |
| Operation Period (h) | 5 | 5 | 5 | 10 |
| Extrusion Rate (kg/hr) | 500 | 600 | 400 | 400 |
| Resin Temp. at Die Port (° C.) | 340 | 340 | 340 | 351 |
| Compound (part by mass) | | | | |
| Top Feed | | | | |
| PPE Powder (A-1) | 47 | 59 | 59 | 53 |
| Silane Treated Clay (B-1) | 12 | 23 | 23 | 37 |
| Aminodized HTR (C-1) | 6 | 6 | — | 10 |
| Side Feed | | | | |
| PPE Powder (A-1) | 23 | 12 | 12 | — |
| Silane Treated Clay (B-1) | 12 | | | |
| Aminodized HTR (C-1) | — | | 6 | — |
| Liquid Feed | — | | | |
| CR741 (D-1) | 18 | 18 | 18 | 25 |
| Physical Property | | | | |
| Tensile Elongation (%) | 110 | 116 | 89 | 42 |
| Dart (J) | 44 | 49 | 42 | 36 |
| Notched Izod Impact Strength (J/m) | 87 | 94 | 77 | 66 |
| Flexural Strength (Mpa) | 124 | 127 | 129 | 128 |
| Flexural Modulus (Mpa) | 3640 | 3710 | 3760 | 3620 |
| Gloss (%) | 87 | 87 | 85 | 72 |
| Appearance of Molded Article | GOOD | GOOD | GOOD | GOOD |
| Flammability (UL94) | V-1 | V-1 | V-1 | V-1 |
| Burning Dripping Proofness (5VA) | Acceptable | Acceptable | Acceptable | Acceptable |
| Production Stability | GOOD | GOOD | GOOD | GOOD |
| Barrel Temp (degree C.)/Vent (b), Liquid Feed (a), Side Feed (s) Position | | | | |
| Barrel 1 | Water Cooling | Water Cooling | Water Cooling | Water Cooling |
| Barrel 2 | 100 | 150 | 150 | 100 |
| Barrel 3 | 100 | 150 | 150 | 100 |
| Barrel 4 | 150 | 200 | 200 | 100 |
| Barrel 5 | 250/s | 250/s | 250/s | 100 |
| Barrel 6 | 280 | 280 | 280 | 100 |
| Barrel 7 | 300 | 300 | 300 | 200 |
| Barrel 8 | 300 | 300 | 300 | 250 |
| Barrel 9 | 270/b | 270/b | 270/b | 280 |
| Barrel 10 | 270 | 270 | 270 | 300 |
| Barrel 11 | 270/b | 270/b | 270/b | 270/b |
| Barrel 12 | 270/a | 270/a | 270/a | 270/a |
| Barrel 13 | 270 | 270 | 270 | 270 |
| SCREW PATTERN | | | | |
| Barrel 1 | | | | |
| Barrel 2 | | | | |
| Barrel 3 | | | | |

TABLE 3-continued

|  | Ex. 9 | Ex. 10 | Ex. 11 | Ex. 12 |
| --- | --- | --- | --- | --- |
| Barrel 4 |  |  |  |  |
| Barrel 5 |  |  |  |  |
| Barrel 6 |  |  |  |  |
| Barrel 7 | R, R, N, L | R, R, N, L | R, R, N, L |  |
| Barrel 8 |  |  |  |  |
| Barrel 9 |  |  |  |  |
| Barrel 10 | L, N | L., R | L, R | R, R, N, L |
| Barrel 11 |  |  |  |  |
| Barrel 12 | R, L | L, N | L, N | L |
| Barrel 13 | SME, SME, R, R | SME, SME, R, R | SME, SME, R, R | SME, SME, R, R |

TABLE 4

|  | Ex. 13 | Ex. 14 | Ex. 15 | Ex. 16 |
| --- | --- | --- | --- | --- |
| Total Barrel Length of Extruder (mm) | 3220 | 3910 | 3910 | 3910 |
| Pre-melt Compounding Zone (%) | 55 | 72 | 65 | 65 |
| Length of Melt Compounding Zone | 1449 | 1095 | 1369 | 1369 |
| Twin Screw Extruder | T-3 | T-4 | T-4 | T-4 |
| Number of Barrels | 13 | 13 | 13 | 13 |
| Screw Rotation Speed (rpm) | 520 | 500 | 450 | 450 |
| Operation Period (h) | 10 | 10 | 10 | 10 |
| Extrusion Rate (kg/hr) | 550 | 1000 | 1000 | 1000 |
| Resin Temp. at Die Port (° C.) | 340 | 345 | 336 | 333 |
| Compound (part by mass) Top Feed |  |  |  |  |
| PPE Powder (A-1) | 28 | 48 | 74 | 74 |
| Silane Treated Clay (B-1) | 57 | 23 | 19 | — |
| Organized Clay (B-2) | — | — | — | 19 |
| Aminodized HTR (C-1) | 15 | 6 | 7 | 7 |
| Side Feed |  |  |  |  |
| PPE Powder (A-1) | — | 23 | — | — |
| HIPS (E-1) | 89 | — | — | — |
| Liquid Feed |  |  |  |  |
| CR741 (D-1) | — | 18 | 23 | 23 |
| Physical Property |  |  |  |  |
| Tensile Elongation (%) | 43 | 94 | 166 | 143 |
| Dart (J) | 27 | 38 | 48 | 50 |
| Notched Izod Impact Strength (J/m) | 52 | 63 | 100 | 152 |
| Flexural Strength (Mpa) | 68 | 110 | 98 | 106 |
| Flexural Modulus (Mpa) | 2560 | 3470 | 3190 | 3220 |
| Gloss (%) | 56 | 82 | 90 | 98 |
| Appearance of Molded Article | GOOD | GOOD | GOOD | GOOD |
| Flammability (UL94) |  | V-1 | V-0 | V-0 |
| Burning Dripping Proofness (5VA) |  | Acceptable | Acceptable | Acceptable |
| Production Stability | GOOD | GOOD | GOOD | GOOD |
| Barrel Temp (degree C.)/Vent (b), Liquid Feed (a), Side Feed (s) Position |  |  |  |  |
| Barrel 1 | Water Cooling | Water Cooling | Water Cooling | Water Cooling |
| Barrel 2 | 100 | 150 | 100 | 100 |
| Barrel 3 | 100 | 150 | 100 | 100 |
| Barrel 4 | 100 | 150 | 100 | 100 |
| Barrel 5 | 200 | 150/s | 100 | 100 |
| Barrel 6 | 250 | 150 | 200 | 200 |
| Barrel 7 | 280 | 250 | 250 | 250 |
| Barrel 8 | 300 | 280 | 280 | 280 |
| Barrel 9 | 270 | 300 | 300 | 300 |
| Barrel 10 | 270/s | 300 | 270 | 270 |
| Barrel 11 | 270/b | 300/b | 270/b | 270/b |
| Barrel 12 | 270 | 300/a | 270/a | 270/a |
| Barrel 13 | 270 | 300 | 270 | 270 |
| SCREW PATTERN |  |  |  |  |
| Barrel 1 |  |  |  |  |
| Barrel 2 |  |  |  |  |
| Barrel 3 |  |  |  |  |
| Barrel 4 |  |  |  |  |
| Barrel 5 |  |  |  |  |
| Barrel 6 |  |  |  |  |
| Barrel 7 |  |  |  |  |
| Barrel 8 | R, R, N, L |  |  |  |
| Barrel 9 |  |  | R, R, N, L | R, R, N, L |

TABLE 4-continued

|  | Ex. 13 | Ex. 14 | Ex. 15 | Ex. 16 |
|---|---|---|---|---|
| Barrel 10 |  | R, R, N, L | L | L |
| Barrel 11 | L |  |  |  |
| Barrel 12 | L | L | L | L |
| Barrel 13 | SME, SME, R, R | R, R | R, R | R, R |

TABLE 5

|  | Comp. Ex. 1 | Comp. Ex. 2 | Comp. Ex. 3 | Comp. Ex. 4 |
|---|---|---|---|---|
| Total Barrel Length of Extruder (mm) | 1080 | 1080 | 1080 | 1080 |
| Pre-melt Compounding Zone (%) | 26 | 26 | 26 | 26 |
| Length of Melt Compounding Zone | 799 | 799 | 799 | 799 |
| Twin Screw Extruder | T-1 | T-1 | T-1 | T-1 |
| Number of Barrels | 10 | 10 | 10 | 10 |
| Screw Rotation Speed (rpm) | 480 | 250 | 250 | 480 |
| Operation Stop Time (min) | 20 | 20 | (20) | — |
| Operation Period (h) | — | — | — | 2 |
| Extrusion Rate (kg/hr) | 10 | 10 | 10 | 30 |
| Resin Temp. at Die Port (° C.) | — | — | — | 320 |
| Compound (part by mass) Top Feed |  |  |  |  |
| PPE Powder (A-1) | 71 | 71 | 71 | — |
| PPE/CR741 Concentrate | — | — | — | 71/18 |
| Silane Treated Clay (B-1) | 23 | 23 | 23 | 23 |
| Aminodized HTR (C-1) | 6 | 6 | 6 | 6 |
| Liquid Feed |  |  |  |  |
| CR741 (D-1) | 18 | 18 | 18 | — |
| Physical Property |  |  | Sampled before stop by feed up |  |
| Tensile Elongation (%) | 12 | 16 | 92 | 4 |
| Dart (J) | 22 | 38 | 45 | 4 |
| Notched Izod Impact Strength (J/m) | 34 | 60 | 112 | 32 |
| Flexural Strength (Mpa) | 127 | 122 | 118 | 123 |
| Flexural Modulus (Mpa) | 3760 | 3660 | 3430 | 3650 |
| Gloss (%) | 77 | 87 | 90 | 62 |
| Appearance of Molded Article | POOR (black spots) | POOR (black spots) | GOOD | POOR (agglomerate) |
| Flammability (UL94) | HB | HB | V-1 | HB |
| Burning Dripping Proofness (5VA) | Unacceptable | Unacceptable | Acceptable | Unacceptable |
| Production Stability | POOR | POOR | POOR | — |
| Barrel Temp (degree C.)/Vent (b), Liquid Feed (a), Side Feed (s) Position |  |  |  |  |
| Barrel 1 | Water Cooling | Water Cooling | Water Cooling | Water Cooling |
| Barrel 2 | 300 | 300 | 300 | 300 |
| Barrel 3 | 300 | 300 | 300 | 300 |
| Barrel 4 | 300 | 300 | 300 | 300 |
| Barrel 5 | 300/b | 300/b | 300/b | 300/b |
| Barrel 6 | 300 | 300 | 300 | 300 |
| Barrel 7 | 300 | 300 | 300 | 300 |
| Barrel 8 | 300 | 300 | 300 | 300 |
| Barrel 9 | 300/a | 300/a | 300/a | 300/a |
| Barrel 10 | 300 | 300 | 300 | 300 |
| SCREW PATTERN |  |  |  |  |
| Barrel 1 |  |  |  |  |
| Barrel 2 |  |  |  |  |
| Barrel 3 | R, R, L, N, L | R, R, L, N, L | R, R, L, N, L | R, R, L, N, L |
| Barrel 4 |  |  |  |  |
| Barrel 5 |  |  |  |  |
| Barrel 6 |  |  |  |  |
| Barrel 7 |  |  |  |  |
| Barrel 8 | R, R, N, L | R, R, N, L | R, R, N, L | R, R, N, L |
| Barrel 9 |  |  |  |  |
| Barrel 10 | R, R, N, L, R, R | R, R, N, L, R, R | R, R, N, L, R, R | R, R, N, L, R, R |

TABLE 6

|  | Comp. Ex. 5 | Comp. Ex. 6 | Comp. Ex. 7 | Comp. Ex. 8 |
|---|---|---|---|---|
| Total Barrel Length of Extruder (mm) | 1080 | 1080 | 3220 | 3220 |
| Pre-melt Compounding Zone (%) | 40 | 40 | 23 | 40 |
| Length of Melt Compounding Zone | 648 | 648 | 2479 | 1932 |

TABLE 6-continued

|  | Comp. Ex. 5 | Comp. Ex. 6 | Comp. Ex. 7 | Comp. Ex. 8 |
|---|---|---|---|---|
| Twin Screw Extruder | T-1 | T-1 | T-2 | T-2 |
| Number of Barrels | 10 | 10 | 13 | 13 |
| Screw Rotation Speed (rpm) | 480 | 480 | 500 | 550 |
| Operation Stop Time (min) | 60 | 30 | 15 | 60 |
| Operation Period (h) | — | — | 2 | 5 |
| Extrusion Rate (kg/hr) | 10 | 10 | 150-200 | 350 |
| Resin Temp. at Die Port (° C.) | — | — | — | — |
| Compound (part by mass) Top Feed | | | | |
| PPE Powder (A-1) | 71 | 59 | 72 | 72 |
| Silane Treated Clay (B-1) | 23 | 23 | 21 | 21 |
| Aminodized HTR (C-1) | 6 | 6 | 7 | 7 |
| Side Feed | | | | |
| PPE Powder (A-1) | — | 12 | — | — |
| Liquid Feed | | | | |
| CR741 (D-1) | 18 | 18 | 19 | 19 |
| Physical Property | | | | |
| Tensile Elongation (%) | 28 | 23 | 26 | 62 |
| Dart (J) | 36 | 39 | 33 | 28 |
| Notched Izod Impact Strength (J/m) | 51 | 64 | 53 | 40 |
| Flexural Strength (Mpa) | 127 | 127 | 115 | 126 |
| Flexural Modulus (Mpa) | 3650 | 3570 | 3550 | 3630 |
| Gloss (%) | 85 | 88 | 78 | 82 |
| Appearance of Molded Article | POOR (black spots) | POOR (black spots) | POOR (black spots) | POOR (black sptos) |
| Flammability (UL94) | HB | HB | HB | HB |
| Burning Dripping Proofness (5VA) | Unacceptable | Unacceptable | — | — |
| Production Stability | POOR | POOR | POOR | POOR |
| Barrel Temp (degree C.)/Vent (b), Liquid Feed (a), Side Feed (s) Position | | | | |
| Barrel 1 | Water Cooling | Water Cooling | Water Cooling | Water Cooling |
| Barrel 2 | 280 | 280 | 270 | 150 |
| Barrel 3 | 280 | 280 | 280 | 200 |
| Barrel 4 | 300 | 300 | 280 | 250 |
| Barrel 5 | 300 | 300 | 300 | 280 |
| Barrel 6 | 270 | 270 | 270 | 300 |
| Barrel 7 | 270 | 270 | 270 | 270 |
| Barrel 8 | 270/b | 270/b | 270 | 270 |
| Barrel 9 | 270/a | 270/a | 270/b | 270/b |
| Barrel 10 | 270 | 270 | 270 | 270 |
| Barrel 11 | — | — | 270/b | 270/b |
| Barrel 12 | — | — | 270/a | 270/a |
| Barrel 13 | — | — | 270 | 270 |
| SCREW PATTERN | | | | |
| Barrel 1 | | | | |
| Barrel 2 | | | | |
| Barrel 3 | | | | |
| Barrel 4 | | | R, R, N, L | |
| Barrel 5 | R, R, N, L | R, R, N, L | | |
| Barrel 6 | | | | R, R, N, L |
| Barrel 7 | L | L | | |
| Barrel 8 | | | R, L | R, L |
| Barrel 9 | L | L | | |
| Barrel 10 | R, R, SME, SME | R, R, SME, SME | | L |
| Barrel 11 | | | | |
| Barrel 12 | | | L, N | L |
| Barrel 13 | | | R, SME, SME, SME | R, R, SME, SME |

TABLE 7

|  | Comp. Ex. 9 | Comp. Ex. 10 | Comp. Ex. 11 | Comp. Ex. 12 | Comp. Ex. 13 |
|---|---|---|---|---|---|
| Total Barrel Length of Extruder (mm) | 3220 | 3220 | 3910 | 3910 | 3910 |
| Pre-melt Compounding Zone (%) | 40 | 40 | 40 | 40 | 82 |
| Length of Melt Compounding Zone | 1932 | 1932 | 2346 | 2346 | 704 |
| Twin Screw Extruder | T-2 | T-2 | T-4 | T-4 | T-4 |
| Number of Barrels | 13 | 13 | 13 | 13 | 13 |
| Screw Rotation Speed (rpm) | 350 | 550 | 550 | 550 | 550-650 |
| Operation Stop Time (min) | 90 | 15 | 45 | 25 | — |
| Operation Period (h) | 3 | 2 | 5 | 2 | 3 |

TABLE 7-continued

|  | Comp. Ex. 9 | Comp. Ex. 10 | Comp. Ex. 11 | Comp. Ex. 12 | Comp. Ex. 13 |
|---|---|---|---|---|---|
| Extrusion Rate (kg/hr) | 200 | 350 | 500 | 500 | 1000-850 |
| Resin Temp. at Die Port (° C.) | — | — | — | — | 332 |
| Compound (part by mass) Top Feed | | | | | |
| PPE Powder (A-1) | 72 | 60 | 74 | 62 | 74 |
| Silane Treated Clay (B-1) | 21 | 21 | 19 | 19 | 19 |
| Aminodized HTR (C-1) | 7 | 7 | 7 | 7 | 7 |
| Side Feed | | | | | |
| PPE Powder (A-1) | — | 12 | — | 12 | — |
| Liquid Feed | | | | | |
| CR741 (D-1) | 19 | 19 | 24 | 24 | 24 |
| Physical Property | | | | | |
| Tensile Elongation (%) | 18 | 20 | 37 | 21 | 8 |
| Dart (J) | 29 | 24 | 35 | 34 | 5 |
| Notched Izod Impact Strength (J/m) | 56 | 55 | 89 | 86 | 35 |
| Flexural Strength (Mpa) | 128 | 125 | 100 | 97 | 115 |
| Flexural Modulus (Mpa) | 3720 | 3600 | 3220 | 3180 | 3210 |
| Gloss (%) | 78 | 76 | 82 | 80 | 74 |
| Appearance of Molded Article | POOR (aggromelate) | POOR (black spots) | POOR (black spots) | POOR (black spots) | POOR (aggromelate) |
| Flammability (UL94) | HB | HB | — | — | — |
| Production Stability | POOR | POOR | POOR | POOR | — |
| Barrel Temp (degree C.)/Vent (b), Liquid Feed (a), Side Feed (s) Position | | | | | |
| Barrel 1 | Water Cooling | Water Cooling | Water Cooling | Water Cooling | Water Cooling |
| Barrel 2 | 150 | 150 | 150 | 150 | 100 |
| Barrel 3 | 200 | 200 | 200 | 200 | 100 |
| Barrel 4 | 250 | 250 | 250 | 250/s | 100 |
| Barrel 5 | 280 | 280/s | 280 | 280 | 150 |
| Barrel 6 | 300 | 300 | 300 | 300 | 200 |
| Barrel 7 | 270 | 270 | 270 | 270 | 200 |
| Barrel 8 | 270 | 270 | 270 | 270 | 200 |
| Barrel 9 | 270/b | 270/b | 270/b | 270/b | 250/b |
| Barrel 10 | 270 | 270 | 270 | 270 | 280 |
| Barrel 11 | 270/b | 270/b | 270/b | 270/b | 300/b |
| Barrel 12 | 270/a | 270/a | 270/a | 270/a | 270/a |
| Barrel 13 | 270 | 270 | 270 | 270 | 270 |
| SCREW PATTERN | | | | | |
| Barrel 1 | | | | | |
| Barrel 2 | | | | | |
| Barrel 3 | | | | | |
| Barrel 4 | | | | | |
| Barrel 5 | | | | | |
| Barrel 6 | R, R, N, L | R, R, N, L | R, R, N, L | R, R, N, L | |
| Barrel 7 | | | | | |
| Barrel 8 | R, L | R, L | L | L | |
| Barrel 9 | | | | | |
| Barrel 10 | L | L | L | L | |
| Barrel 11 | | | | | R, R, N, L |
| Barrel 12 | L | L | L | L | |
| Barrel 13 | R, R, SME, SME | R, R, SME, SME | R, R | R, R | R, R, N |

INDUSTRIAL APPLICABILITY

According to the production process for a polyphenylene ether composition of the present invention, mass productivity and production stability of a polyphenylene ether composition excellent in surface appearance of molded article, heat resistance, stiffness and impact resistance are remarkably improved, resulting in long-period, stable production of polyphenylene ether composition at a high extrusion rate with a mass-production machine, which cannot be achieved by the conventional method. In addition, the resultant polyphenylene ether composition has excellent mechanical properties and therefore it is applicable to various fields such as household electrical appliances, office equipments, information and communication equipments, electric and electronic components, building materials, articles for daily use, toys, game machines, miscellaneous goods and automobile parts and the like. For example, there can be exemplified:

parts of a television such as a television housing, a television chassis and a deflection yoke;

home appliances, office automation equipments, and electric and electronic parts such as an AC adapter, a power pack, parts for an air conditioner, audio parts, a lighting cover, parts for a computer game machine, a monitor housing, a monitor chassis, a notebook computer housing, a notebook computer battery, a MiniDisc® chassis, a DVD (digital versatile disc) chassis, a tray of—in-car CD changer, a frame of—in-car DVD deck, a motor case, a gear box, a liquid crystal projector housing, a PDA (personal digital assistant) housing, an antenna sheath, a printer housing, a printer chassis, a box accommodated printer laser light source, a toner cartridge, an ink cartridge, a paper feed tray, a scanner housing, a scanner frame, a mobile phone housing, and a mobile phone battery;

building materials, articles for daily use, playthings and miscellaneous goods such as a bathtub material, a shower head, a pump housing, parts of an air purification system, a siding, kitchen accessories, pipes, a gutter, a sound insulation wall, a window frame, a window sash, parts of a signal, parts of pachinko, toys, sporting goods, playground equipments, fishing goods, a food container, a cosmetic container, and a machine cover;

information and communication equipments and communication parts such as a terminal adapter, a router, a modem, a cable guide, a wire covering material, digital camera peripheral parts, and flash memory card parts; and automobile parts such as an instrument panel, a center cluster, a meter cluster, a glove compartment, an airbag, a defroster garnish, an air duct, a heater control, a steering column cover, a knee bolster, an air defroster, a door trim, a sun shade, a roof liner, a rear parcel shelf, a pillar cover, a pillar impact absorber, a bonnet air scope, a radiator grille, head lamp parts, signal lamp parts, fog lamp parts, a bumper, a head lamp finisher, a license plate finisher, a fender, a door handle, a door miller, a door panel, a rear quarter panel, rear combination lamp parts, a tail gate panel, a luggage room trim, a wheel cover, a side rear cover, a center cap, a spoiler, a rear finisher, a battery tray, a battery housing and a front end module.

What is claimed is:

1. A production process of polyphenylene ether composition comprising
    pre-melt compounding 20 to 98.5% by mass of a polyphenylene ether powder (I), 1 to 60% by mass of an inorganic filler powder (II) and 0.5 to 20% by mass of a thermoplastic elastomer having functional group (III), followed by melt compounding;
    wherein melt compounding is conducted using a twin-screw extruder having a total length of barrels of 800 mm to 5000 mm with a screw rotating speed of 400 rpm to 650 rpm, and a pre-melt compounding zone occupies 45 to 80% of upstream of the twin-screw extruder based on the total length 100% of the twin-screw extruder when a drive side and a molten compound discharging side of the twin-screw extruder are regarded as upstream and downstream, respectively;
    wherein the reduction rate (ignition loss) of the inorganic filler powder (II) after having been heated at 450° C. for 3 hours is 1 to 50% by mass based on the original.

2. The production process according to claim 1, wherein the ratio of the length of barrel (mm) to diameter of screw (mm) (L/D) is from 35 to 90.

3. The production process according to claim 1, wherein 5 to 50% of the total amount of the polyphenylene ether powder (I) is side fed in the middle of the pre-melt compounding zone.

4. The production process according to claim 1, wherein the inorganic filler powder (II) is a kaolin clay.

5. The production process according to claim 1, wherein the inorganic filler powder (II) is a clay having a silane compound treated surface.

6. The production process according to claim 1, wherein the inorganic filler powder (II) is an organically modified clay.

7. The production process according to claim 1, wherein the thermoplastic elastomer having the functional group (III) is a styrene thermoplastic elastomer modified by imidazolidinone compound.

8. The production process according to claim 1, further comprising 5 to 40 parts by mass of an aromatic phosphate ester (IV) based on 100 parts by mass of the total of the components (I), (II) and (III).

9. The production process according to claim 1, wherein the length of melt compounding zone of the twin-screw extruder is 300 to 1,620 mm.

* * * * *